(No Model.)
F. D. OWEN.
MEANS FOR DECREASING THE FRICTIONAL RESISTANCE TO VESSELS.
No. 312,500. Patented Feb. 17, 1885.
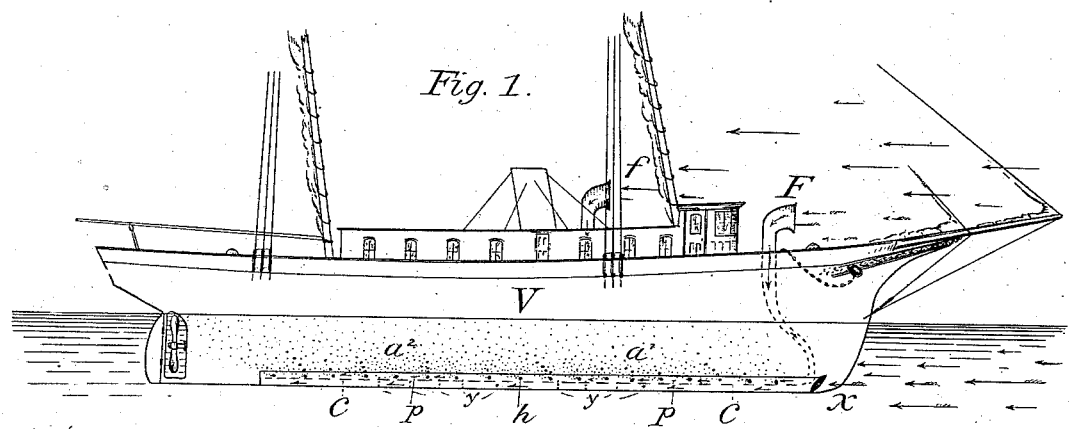
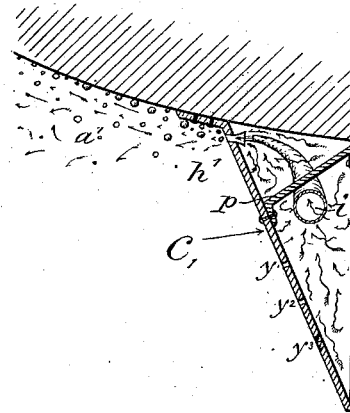
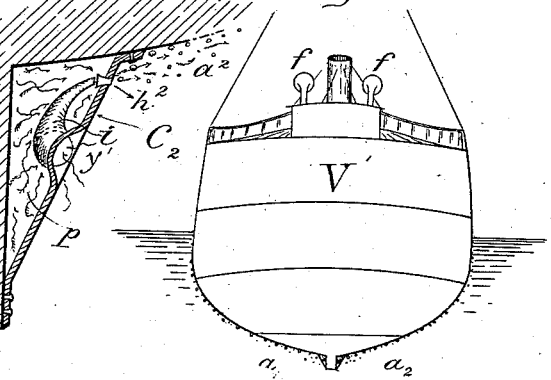
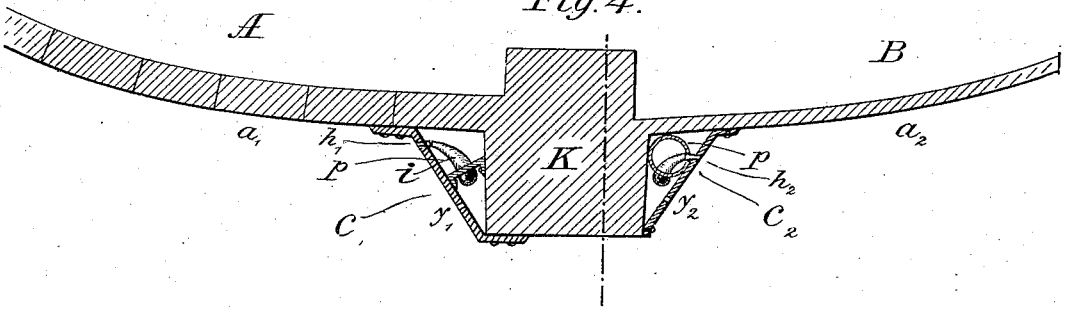
Witnesses:
Inventor.

UNITED STATES PATENT OFFICE.

FREDERICK D. OWEN, OF WASHINGTON, DISTRICT OF COLUMBIA.

MEANS FOR DECREASING THE FRICTIONAL RESISTANCE TO VESSELS.

SPECIFICATION forming part of Letters Patent No. 312,500, dated February 17, 1885.

Application filed July 19, 1884. (No model.)

*To all whom it may concern:*

Be it known that I, FREDERICK D. OWEN, a citizen of the United States, residing in the city of Washington, District of Columbia, have invented certain new and useful Improvements in the Means for Decreasing the Frictional Resistance to Vessels; and I hereby declare the following to be a full, clear, and exact description of the same, reference being had to the accompanying drawings.

The theory upon which my invention is based is that, if a current of air be drawn or forced through a confined space extending along or near the keel of the vessel, if this space has numerous outlets from which the air can escape into the surrounding water, and if this escape of air be aided by an injector consisting of jets of escaping water impinging against the air-vents, the air-jets are separated into small spherical or ellipsoidal globules. These particles, which at first have a tendency outward, are soon driven upward by the pressure of the surrounding water, and gradually rising close to the submerged portion of the vessel reach the surface of the water and escape. New globules are constantly being formed in the same manner, and the result is that close to the vessel's side is a mass of revolving balls of air, over which the ship passes, the water resistance being decreased on the same principle that sliding friction in machinery is decreased by the use of anti-friction balls or rollers.

My invention consists in the construction of the vessel for accomplishing the results desired.

In the drawings, Figure 1 represents a side elevation of a moving vessel. Fig. 2 is an end view of the same. Fig. 3 is a cross-section of the keel and air and water channels. Fig. 4 is a somewhat similar view, showing different constructions, adapted, respectively, to wooden and iron vessels.

In Fig. 1, V represents the hull of a vessel supposed to be in motion.

C represents a wall or casing which incloses the angle formed by the keel and hull, making a triangular inclosed chamber, as shown in Figs. 2, 3, and 4. This chamber contains or forms spaces or passages for the currents of air and water which are ejected from it, as hereinafter described, and various forms of construction may be adopted, some of which I have illustrated in the drawings. On the left side of Fig. 3 the triangular chamber is divided by a partition, P, into two, the upper being the air and the lower the water space. In pratical use I connect the upper space with one or more pipes, F, extending above the deck, and having expanded mouths turned toward the bow of the vessel, or toward incoming wind-currents. The motion of the vessel causes currents of air to enter these pipes, which pass down into the air-space, which is provided with a series of openings, $h'$, placed closely together along its entire length, which is substantially that of the keel. It will be obvious, however, that means may be provided—such as a pump or a pressure-blower—for forcing air into the pipe, if found necessary or expedient. The water-passage formed by the lower inclosed section of the chamber C extends forward parallel to the air-passage, and has an open and preferably enlarged mouth at its front end near the bow of the ship. A strong current of water is necessarily forced into the passage by the onward movement of the vessel. At intervals throughout the water-space I provide a series of injectors, $i$, having narrow compressed nozzles, which pass through the partition P and terminate opposite and close to the air-vents $h'$. Strong jets of water are thus forced through the air-vents, the effect of which is to increase the draft in the air-chamber and to draw the air into the vents and out at right angles to the keel into the surrounding water.

I have found that the effect of the united air and water currents is to break up, diffuse, or separate the air into spherical globules in countless numbers, which are forced up by the hydrostatic pressure from below against the skin of the vessel. The vessel thereby passes over and through a bed of these rolling globules of air, the effect of which is to materially reduce the skin friction or resistance. The air globules pass upward and aft, closely following the curved surface of the hull, their places being continually filled until they are lost on reaching the surface. Openings $y'\ y^2$ $y^3$ may also be provided in casing $e$, so that water may be admitted from the sides into the water-chamber. The latter feature is illustrated in Fig. 3, (right side,) where the partition is dispensed with. Openings are formed in the casing, with which the enlarged ends of the injectors register. The main portion of the triangular chamber is therefore the air-space, there being no water-chamber proper.

In Fig. 4 (left side) is shown a construction substantially like that of Fig. 3, intended for a wooden vessel, and on the right side that for an iron vessel. In the latter form, the air-space is an extension of the air-supply pipe, through which the injectors pass.

It will be observed that in my method I utilize the motion of the vessel itself to decrease the friction which that motion causes. Ordinarily I employ nothing but air and water, which I obtain without the employment of power, from the atmosphere and the water surrounding the vessel. I may, however, under some circumstances employ certain gases which not only produce the results heretofore ascribed to air, but incidentally tend to keep the bottom of the ship clean, being destructive both to animal and vegetable life.

I wish to clearly distinguish my invention from methods of and devices for propulsion wherein currents of air or jets of water are utilized.

It has long been known that vessels may be propelled by the escape of currents of air to the stern and in line with the keel. To do this I make no pretension, my object being to change the normal condition of the water immediately surrounding and adhering to a vessel so that propulsion by the ordinary means will be materially aided, speed increased, and the consumption of fuel diminished. Under some circumstances it may be found desirable to form the air and water spaces in the keel, which is made hollow for that purpose.

I claim—

1. Means for lessening the frictional resistance to vessels, consisting of one or more inclosed longitudinal pipes or chambers located in close proximity to the keel of the vessel, open at their front ends, so that water may be admitted or forced into them, and provided with perforations, and one or more perforated air-pipes within the respective water pipes or chambers the front ends of which are open to the air above the water-line, or into which pipes air may be forced, whereby air and water are simultaneously discharged through the perforations, forming bubbles, and producing a rolling film in close contact with the skin or exterior of the vessel, substantially as described.

2. In combination with the perforated air-pipe extending along the outside of the vessel and near the keel, and adapted to be supplied with air substantially as described, a series of curved conical nozzles or injectors adapted to receive and discharge water through the perforations of the air-pipe, substantially as and for the purposes set forth.

FREDK. D. OWEN.

Witnesses:
DE B. RANDOLPH KEIM,
D. A. DENISON.